US011226811B2

(12) United States Patent
Lappi et al.

(10) Patent No.: US 11,226,811 B2
(45) Date of Patent: Jan. 18, 2022

(54) POWER SAFE OFFLINE DOWNLOAD

(71) Applicant: Western Digital Technologies, Inc., San Jose, CA (US)

(72) Inventors: Cory Lappi, Rochester, MN (US); William Jared Walker, Rochester, MN (US); Xin Chen, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/228,016

(22) Filed: Apr. 12, 2021

(65) Prior Publication Data
US 2021/0232385 A1 Jul. 29, 2021

Related U.S. Application Data

(62) Division of application No. 16/057,571, filed on Aug. 7, 2018, now Pat. No. 10,990,380.

(60) Provisional application No. 62/561,616, filed on Sep. 21, 2017.

(51) Int. Cl.
*G06F 9/44* (2018.01)
*G06F 8/654* (2018.01)
*G06F 9/4401* (2018.01)
*G06F 3/06* (2006.01)

(52) U.S. Cl.
CPC ............ *G06F 8/654* (2018.02); *G06F 3/0604* (2013.01); *G06F 3/0607* (2013.01); *G06F 3/0632* (2013.01); *G06F 3/0659* (2013.01); *G06F 3/0679* (2013.01); *G06F 9/4401* (2013.01)

(58) Field of Classification Search
None
See application file for complete search history.

(56) References Cited

U.S. PATENT DOCUMENTS

| 9,667,074 | B2 * | 5/2017 | Farhi | H02J 7/0071 |
| 2002/0166027 | A1 * | 11/2002 | Shirasawa | G06F 8/65 717/168 |
| 2010/0257519 | A1 * | 10/2010 | Chang | G06F 8/65 717/168 |
| 2015/0234650 | A1 * | 8/2015 | Kim | G06F 8/654 717/168 |
| 2016/0103481 | A1 * | 4/2016 | Griffith | G06F 3/0625 713/323 |
| 2016/0210132 | A1 * | 7/2016 | Gerhart | G06F 8/65 |

* cited by examiner

*Primary Examiner* — Qamrun Nahar
(74) *Attorney, Agent, or Firm* — Patterson & Sheridan, LLP; Steven H. Versteeg

(57) ABSTRACT

The present disclosure generally relates to using a single firmware slot in a slower boot media while temporarily leveraging high speed media and dual boot designs to allow booting into a cached copy of firmware to guarantee power safety while writing the single firmware slot on the slower boot media. The device boots up with original firmware stored in a first non-volatile memory device when powered on. The device then checks a second non-volatile memory device for new firmware. If there is new firmware stored in the second non-volatile memory device, the device loads the new firmware into a volatile memory device and reboots with the new firmware. The device then writes the new firmware to the firmware slot of the first non-volatile memory device. If the device experiences a power cycle while writing the new firmware, the device can reboot with a cached copy of the new firmware.

20 Claims, 3 Drawing Sheets

POWER SAFE OFFLINE DOWNLOAD

CROSS-REFERENCE TO RELATED APPLICATIONS

This application is a divisional of U.S. Non-Provisional patent application Ser. No. 16/057,571, filed Aug. 7, 2018, which claims benefit of U.S. Provisional Patent Application Ser. No. 62/561,616, filed Sep. 21, 2017, which is herein incorporated by reference.

BACKGROUND OF THE DISCLOSURE

Field of the Disclosure

Embodiments of the present disclosure generally relate to a storage device, such as a solid state drive (SSD), and a method of operating the storage device.

Description of the Related Art

Firmware is provided with storage devices to allow the device to perform desired functions. From time to time, firmware needs to be updated. This is particularly true when bugs are discovered in firmware, firmware is rewritten to perform a new task, or firmware is rewritten to perform specified tasks in a different order. Firmware updates to storage devices can be challenging, as extreme care must be exercised in writing and correctly implementing the firmware.

Firmware updates need to be downloaded to the device, but downloading the firmware typically sacrifices firmware update power safety in order to increase the speed of the download and to reduce the number of copies of firmware in the slow boot media (i.e., NOR). As such, the slow boot media download is typically not power safe, and in the event of a power loss, the device may be compromised with potentially corrupted firmware, making the device unusable.

Alternatively, the device may be power-safe, but have a long response time. The power-safe device may have multiple firmware slots in the slow boot media, which requires excess download time to write and update the firmware and incurs extra costs.

Therefore, there is a need in the art to have a power-safe download that is quick.

SUMMARY OF THE DISCLOSURE

The present disclosure generally relates to using a single firmware slot in a slower boot media while temporarily leveraging high speed media and dual boot designs to allow booting into a cached copy of firmware to guarantee power safety while writing the single firmware slot on the slower boot media. The device boots up with original firmware stored in a first non-volatile memory device when powered on. The device then checks a second non-volatile memory device for new firmware. If there is new firmware stored in the second non-volatile memory device, the device loads the new firmware into a volatile memory device and reboots with the new firmware. The device then writes the new firmware to the firmware slot of the first non-volatile memory device. If the device experiences a power cycle while writing the new firmware, the device can reboot with a cached copy of the new firmware.

In one embodiment, a method for operating a storage device comprises writing new firmware to a first non-volatile memory device of the storage device, loading the new firmware into a volatile memory device of the storage device from the first non-volatile memory device, and booting the storage device with the new firmware loaded into the volatile memory device. The method further comprises updating a firmware slot on a second non-volatile memory device of the storage device with the new firmware, and updating a status of the second non-volatile memory device once the firmware slot is finished updating.

In another embodiment, a method for operating a storage device having one or more non-volatile memory devices and a volatile memory device comprises booting the storage device with an original firmware from a first non-volatile memory device of the one or more non-volatile memory devices, determining an updated firmware is available in a second non-volatile memory device of the one or more non-volatile memory devices, and loading the updated firmware into the volatile memory device. The method further comprises rebooting the storage device with the updated firmware loaded into the volatile memory device, writing the updated firmware to the first non-volatile memory device, and rebooting the storage device with the updated firmware loaded into the volatile memory device when the storage device loses power before the updated firmware is completely written to the first non-volatile memory device.

In yet another embodiment, a method for operating a storage device having a non-volatile memory device and a volatile memory device comprises writing an updated firmware to a firmware slot of the non-volatile memory device, powering on the storage device after experiencing a power cycle before the updated firmware could be fully written to the firmware slot of the non-volatile memory device, booting the storage device with the updated firmware loaded into the volatile memory device, re-writing the updated firmware to the firmware slot of the non-volatile memory device, and updating a status of the non-volatile memory device once the firmware slot is finished writing.

In one embodiment, a data storage device comprises a plurality of non-volatile memory devices, one or more volatile memory devices, and a controller coupled to the plurality of non-volatile memory devices and the one or more volatile memory devices. The controller is configured to boot the data storage device with an original firmware from a first non-volatile memory device of the plurality of non-volatile memory devices, load a firmware update to the one or more volatile memory devices, reboot the data storage device with the firmware update loaded into the one or more volatile memory devices, and write the firmware update to the first non-volatile memory device.

In another embodiment, a data storage device comprises a plurality of non-volatile memory devices and one or more volatile memory devices. The data storage device further comprises means for booting the data storage device with an original firmware stored in a first non-volatile memory device of the plurality of non-volatile memory devices, means for writing an updated firmware to a second non-volatile memory device of the plurality of non-volatile memory devices, means for storing the updated firmware in the one or more volatile memory devices, means for rebooting the data storage device with the updated firmware stored in the one or more volatile memory devices, and means for writing the updated firmware to the first non-volatile memory device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to using a single firmware slot in a slower boot media while temporarily leveraging high speed media and dual boot designs to allow booting into a cached copy of firmware to guarantee power safety while writing the single firmware slot on the slower boot media. The device boots up with original firmware stored in a first non-volatile memory device when powered on. The device then checks a second non-volatile memory device for new firmware. If there is new firmware stored in the second non-volatile memory device, the device loads the new firmware into a volatile memory device and reboots with the new firmware. The device then writes the new firmware to the firmware slot of the first non-volatile memory device. If the device experiences a power cycle while writing the new firmware, the device can reboot with a cached copy of the new firmware.

Figure 1:
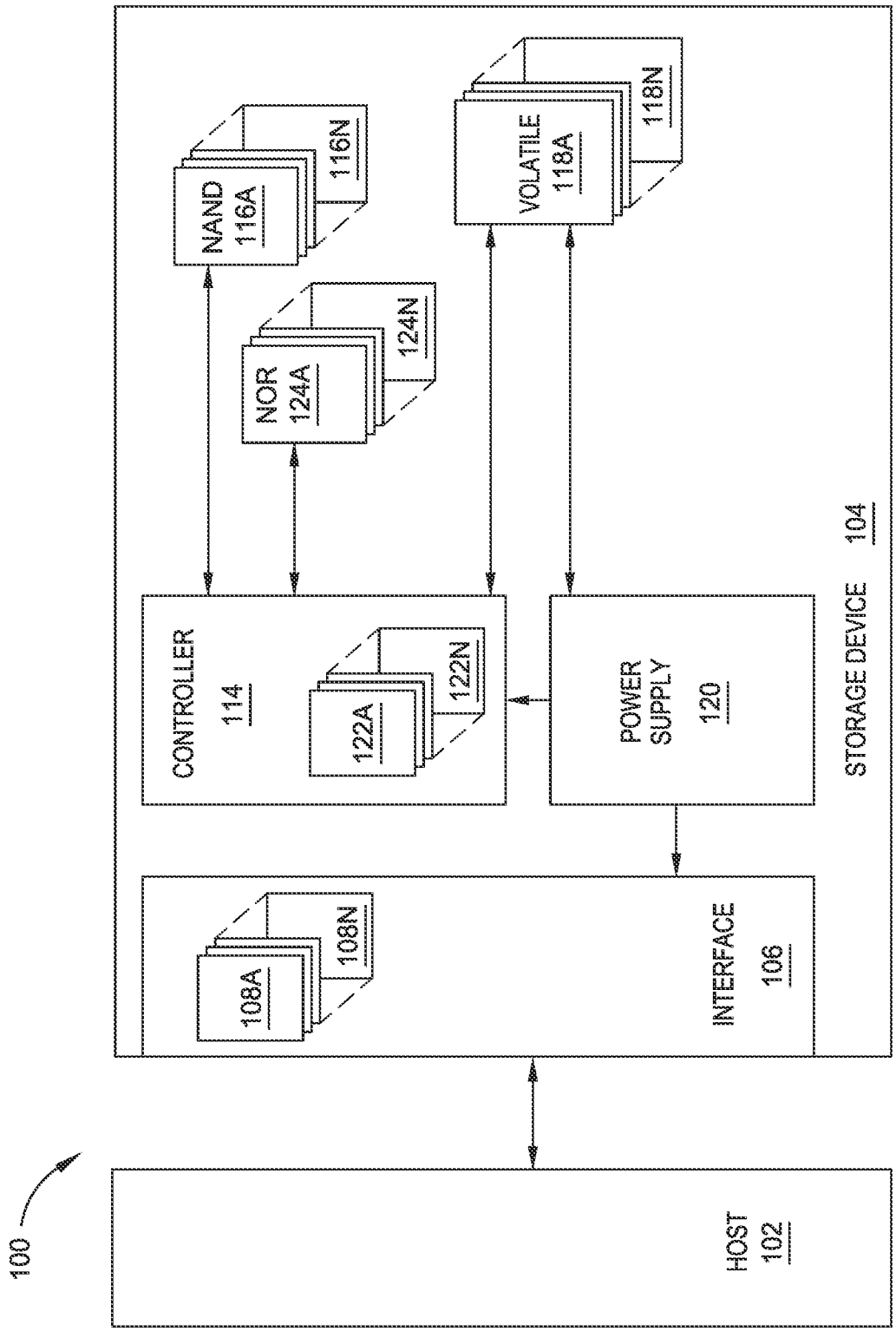
FIG. 1 is a schematic illustration of data storage system according to one embodiment.

FIG. 1 is a schematic illustration of data storage system 100 according to one embodiment. The data storage system 100 includes a host device 102 and a storage device 104. The host device 102 is coupled to the storage device 104 both physically as well as electronically through an interface 106 that contains one or more phys 108A-108N.

The storage device 104 includes a controller 114 that is coupled to and communicates with the interface 106. A power supply 120 is coupled to the interface 106 and the controller 114. The controller 114 includes one or more processors 122A-122N. The controller 114 is coupled to one or more fast or quick non-volatile memory devices 116A-116N, one or more volatile memory devices 118A-118N, and one or more slow non-volatile memory devices 124A-124N. An example of a slow non-volatile memory device 124A-124N is a NOR memory device and an example of a fast or quick non-volatile memory device 116A-116N is a NAND memory device. It is to be understood that NOR memory devices are but one example of the slow non-volatile memory devices 124A-124N and thus, the slow non-volatile memory devices 124A-124N are not to be limited to NOR memory devices. Additionally, it is to be understood that NAND memory devices are but one example of the fast non-volatile memory devices 116A-1164N and thus, the fast non-volatile memory devices 116A-116N are not to be limited to NAND memory devices.

In some examples, the storage device 104 may include additional components not shown in FIG. 1 for sake of clarity. For example, the storage device 104 may include a printed board (PB) to which components of the storage device 104 are mechanically attached and which includes electrically conductive traces that electrically interconnect components of storage device 104, or the like. In some examples, the physical dimensions and connector configurations of the storage device 104 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.). In some examples, storage device 104 may be directly coupled (e.g., directly soldered) to a motherboard of the host device 102.

The interface 106 may operate in accordance with any suitable protocol. For example, the interface 106 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), PCI-express, or Non-Volatile Memory Express (NVMe). The electrical connection of the interface 106 (e.g., the data bus, the control bus, or both) is electrically connected to the controller 114, providing electrical connection between the host device 102 and the controller 114, allowing data to be exchanged between host device the 102 and the controller 114. In some examples, the electrical connection of the interface 106 may also permit the storage device 104 to receive power from the host device 102. For example, as illustrated in FIG. 1, the power supply 120 may receive power from host device the 102 via the interface 106.

The storage device 104 includes the power supply 120, which may provide power to one or more components of the storage device 104 and is optional. When operating in a standard mode, the power supply 120 may provide power to the one or more components using power provided by an external device, such as the host device 102. For instance, the power supply 120 may provide power to the one or more components using power received from the host device 102 via the interface 106. In some examples, the power supply 120 may include one or more power storage components configured to provide power to the one or more components when operating in a shutdown mode, such as where power ceases to be received from the external device. In this way, the power supply 120 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 104 includes one or more volatile memory devices 118A-118N, which may be used by the controller 114 to temporarily store information. In some examples, the controller 114 may use the one or more volatile memory devices 118A-118N as a cache. For instance, the controller 114 may store cached information in the one or more volatile memory devices 118A-118N until the cached information is written to the one or more non-volatile memory devices 116A-116N or 124A-124N. The one or more volatile memory devices 118A-118N may consume power received from the power supply 120 to maintain the data stored in the one or more volatile memory devices 118A-118N. Examples of volatile memory include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)). In at least one implementation, the one or more volatile memory devices 118A-118N comprise at least one DRAM device.

The storage device 104 includes the controller 114, which may manage one or more operations of the storage device 104. For instance, the controller 114 may manage the reading of data from and/or the writing of data to the one or more non-volatile memory devices 116A-116N, 124A-124N and the one or more volatile memory devices 118A-118N. In some examples, the controller 114 may manage the reading of data from and/or the writing of data to the one or more non-volatile memory devices 116A-116N or one or more volatile memory devices 118A-118N by exchanging signals with the one or more non-volatile memory devices 116A-116N or the one or more volatile memory devices 118A-118N. As discussed above, the controller 114 may exchange signals with the one or more non-volatile memory devices 116A-116N or the one or more volatile memory devices 118A-118N in accordance with a communication protocol.

The controller 114 includes one or more processors 122A-122N. The processors 122A-122N may be configured to execute tasks. The tasks may be of different types, and, in some examples, each respective type of task may be stored in or associated with a respective task queue while waiting for execution by the processor 122A-122N. The different types of tasks may include, for example, front end tasks, which may include receiving and interpreting instructions received from the host device 102. Other types of tasks including caching; back-end tasks, which may include reading data from or writing data to non-volatile memory 116; housing-keeping, which may include garbage collection, wear leveling, TRIM, or the like; and system tasks. In some examples, the processor 122A-122N may be referred to as a computer unit, a processing unit, a core, or a central processing unit (CPU).

As will be discussed in greater detail below, a dual-boot process can be used when new firmware is to be installed. Specifically, the existing firmware remains intact and the new firmware is downloaded to a new non-volatile location on a faster non-volatile memory (for example, the one or more non-volatile memory devices 116A-116N). The existing firmware will typically be stored on the slower non-volatile memory (for example, the one or more non-volatile memory devices 124A-124N).

As discussed herein, a single firmware slot in a NOR memory device is used. High speed media is leveraged in the dual boot process so that temporarily booting from a cached copy of firmware is used to guarantee power safety while writing the single firmware slot on the slower boot media. In a basic sense, the bootloader is kept separate from the updated firmware and is not updateable in a power safe way, but is capable of bringing up the high speed media.

In a specific example, the new firmware is written to non-volatile memory on a fast non-volatile memory device such as a NAND memory device 116A, rather than a slow non-volatile memory like a NOR memory device 124A. Typically, a NOR memory device 124A is used for firmware storage because the NOR memory device 124A is available immediately on power-up. The boot is initially run through the NOR memory device 124A, and then a bootloader (e.g., a portion of the firmware) brings up the NAND memory device 116A to check whether the NAND memory device 116A has a download package for the NOR memory device 124A. The download package includes new firmware, but does not include a new or updated bootloader. Thus, the original bootloader is capable of bringing up the NAND memory device 116A, and is separate and immutable from the new firmware. The new firmware that is in the NAND memory device 116A is loaded into a DRAM device 118A and booted into via the DRAM device 118A.

After booting with the new firmware through the DRAM device 118A, the firmware in the NAND memory device 116A is written to the NOR memory device 124A. Since the NOR memory device 124A includes only a single firmware slot, the bootloader is kept separate from the firmware so that the bootloader cannot be corrupted by a power cycle. The writing to the single firmware slot of the NOR memory device 124A, or syncing, occurs in block fashion. Only once the syncing is complete is a status of "done" sent to the one or more processors 122A-122N indicating the syncing is complete. Even if a power cycle occurs while the new firmware is being written to the NOR memory device 124A, the new firmware will still be used so long as the new firmware has been written into the NAND memory device 116A and loaded into the DRAM device 118A. Thus, the firmware download is power-safe as well as fast.

Once the storage device 104 receives the new firmware from the host device 102, the firmware will be written to the reserved area (i.e., NAND 116A), loaded into memory (i.e., DRAM 118A), booted into the DRAM device 118A, and then updated to the single firmware slot on the NOR memory device 124A. The copy of the firmware on the NAND memory device 116A is uploaded by the bootloader and then booted into if a power cycle occurs before the NOR firmware slot is fully updated. The NOR firmware slot is written completely before the status is returned on the final write buffer of the download. In other words, the status is not returned until the writing to the NOR memory device 124A is complete.

The advantages of the disclosure include the NOR memory device 124A usage being minimal, power safety is maintained, slow download times are reduced, and device cost is reduced. The firmware download time is reduced and optimized by utilizing a single firmware slot on the NOR memory device 124A. Additionally, by first writing the new firmware to the NAND memory device 116A and loading the new firmware into the DRAM device 118A, the firmware download is power-safe. If a power cycle occurs while the new firmware is being written to the firmware slot on the NOR memory device 124A, the storage device 104 can reboot with the new firmware loaded into the DRAM device 118A, and re-write the new firmware to the NOR firmware slot. Therefore, the storage device 104 is power-safe with quick download times.

Figure 2A:
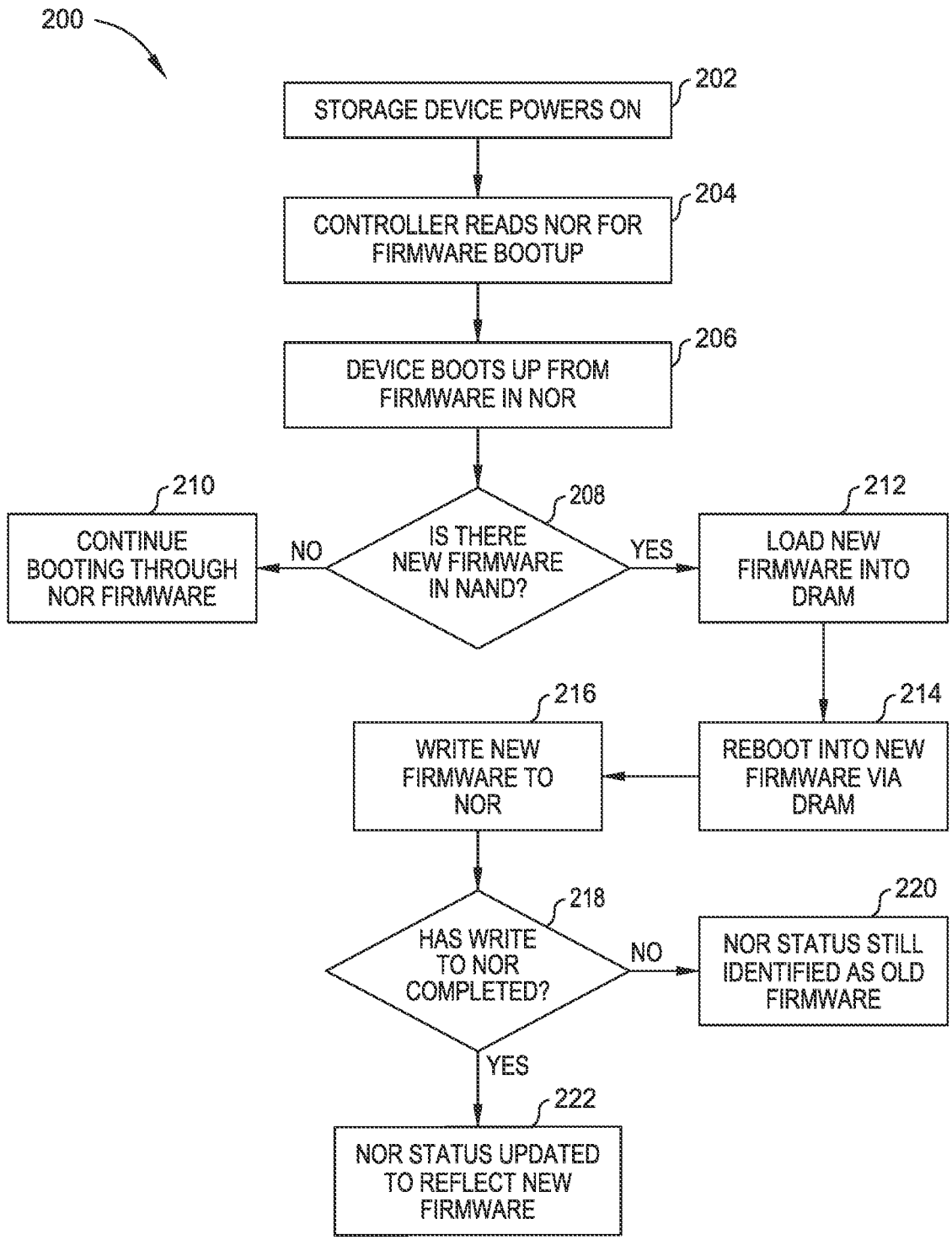
FIG. 2A is a schematic illustration of a method of performing a dual-boot process according to one embodiment.

FIG. 2A is a schematic illustration of a method 200 of a storage device performing a dual-boot process according to one embodiment. The method 200 may be executed by the data storage system 100 having the host device 102 and the storage device 104. The method 200 begins at item 202 where a storage device begins to power on.

In item 204, a controller, such as controller 114 of FIG. 1, reads the existing firmware which resides in the slow non-volatile memory, such as a NOR memory device. The NOR memory device may be a NOR memory device from the one or more NOR memory devices 124A-124N of FIG. 1. The storage device begins to boot up with the existing or original firmware stored on the NOR memory device in item 206. In item 208, as the storage device is booting up, the controller checks a NAND memory device to determine if there is new firmware. The NAND memory device may be a NAND memory device from the one or more NAND memory devices 116A-116N of FIG. 1. The controller may use a bootloader stored in a NOR memory device to bring up and check the NAND memory device for new firmware. The NAND memory device may receive new firmware as a download package from the host device, and may store the new firmware download package to a reserved area of the NAND memory device. The new firmware download package does not include a new bootloader. As such, the bootloader is not updatable in a power safe way.

If there is no new firmware written in the NAND memory device in item 208, then the boot up continues through the NOR memory device in item 210. If, however, there is new firmware in the NAND memory device, then the method 200 proceeds to item 212. In item 212, the new firmware that is in the NAND memory device is cached or loaded into a DRAM device while the boot up through the NOR memory device continues. The DRAM device may be a DRAM device from the one or more volatile memory devices 118A-118N of FIG. 1. The new firmware may be loaded into the DRAM device using the bootloader.

In item 214, once the new firmware is loaded into the DRAM device, the storage device is rebooted through the new firmware. In item 216, once the reboot with the new firmware is complete, the single firmware slot on the NOR memory device is updated with the new firmware. The new firmware is written to the firmware slot of the NOR memory device so that subsequent boot-ups will occur through the NOR memory device. By utilizing the dual boot design to reboot the storage device through the cached copy of the updated firmware via the DRAM device, the updated firmware can be written to the NOR memory device and firmware update power safety is not sacrificed.

In item 218, a determination is made as to whether the write to the NOR memory device was completed. If the determination is made that the write to the NOR memory device has been completed in item 218, then the status of the NOR memory device is updated in item 220. Updating the status of the NOR memory device indicates that the new firmware was successfully and completely written to the NOR memory device, and allows the storage system to boot up with the new firmware stored on the NOR memory device for subsequent power ups of the storage device.

If the firmware stored in the NOR memory device has not been updated (i.e., the new firmware update has not been completely written to the single firmware slot of the NOR memory device), then the status of the NOR memory device remains unchanged in item 222. A power cycle or power loss may interrupt the write of the new firmware to the firmware slot of NOR memory device and cause the firmware stored in the NOR memory device to not be updated. Thus, the status of the NOR memory device remaining unchanged in item 222 may indicate that the NOR memory device contains corrupted or non-operational firmware. Following item 222 of the method 200, storage device may proceed to method 250 of FIG. 2B.

Figure 2B:
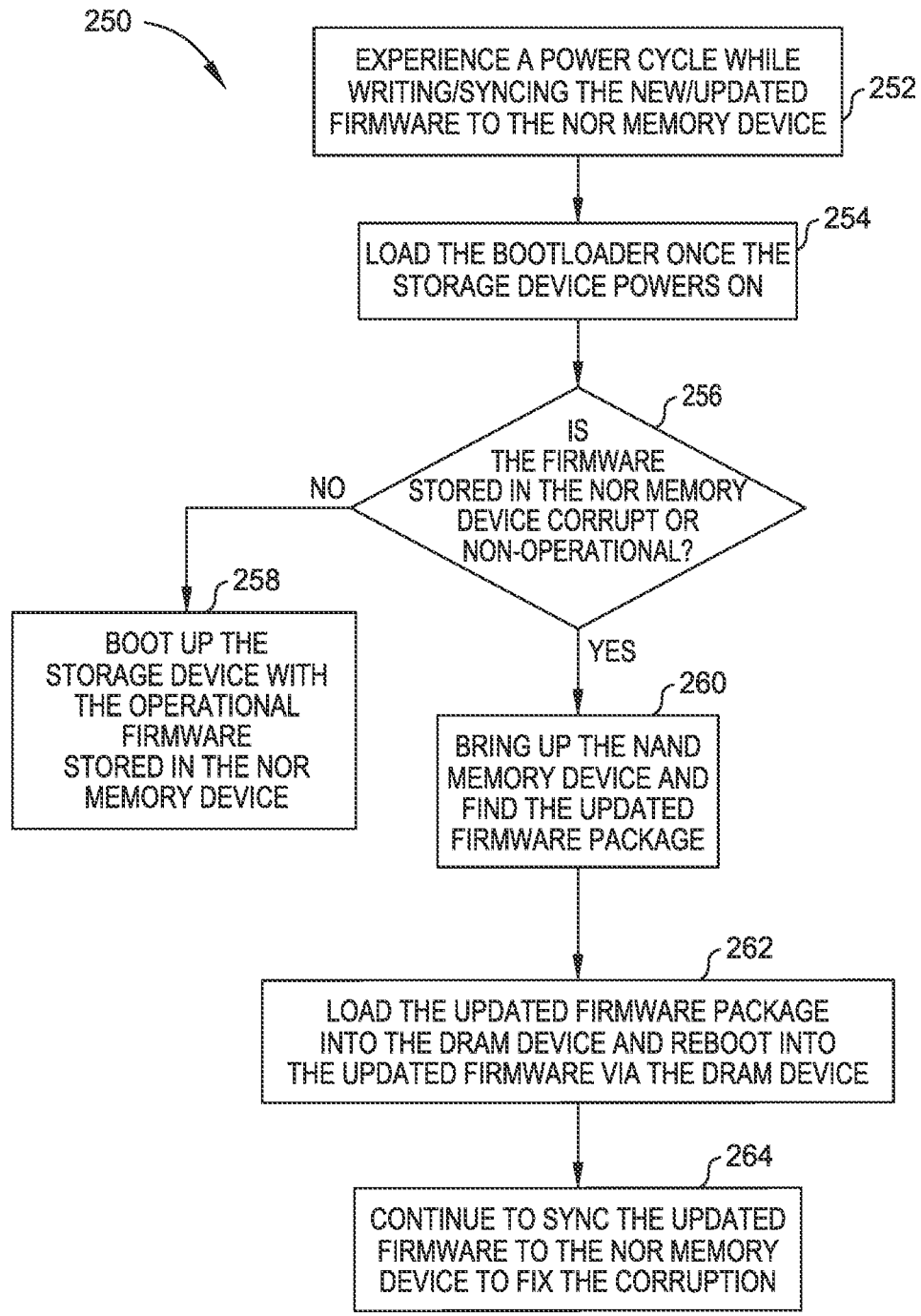
FIG. 2B is a schematic illustration of a method of the storage device having a single firmware slot on a NOR memory device rebooting after experiencing a power cycle.

FIG. 2B is a schematic illustration of a method 250 of the storage device having a single firmware slot on a NOR memory device rebooting after experiencing a power cycle. The method 250 may directly follow the method 200. For example, if the storage device experiences a power cycle or power loss in item 216 of the method 200, the storage device may proceed to execute the method 250.

The method 250 begins at item 252, where the storage device experiences a power cycle while writing or syncing the new/updated firmware to the single firmware slot of the NOR memory device. If there is a power loss or power cycle while writing or syncing the updated firmware to the NOR device, the updated firmware may not be completely written to the NOR memory device, and as such, may be corrupt. The storage device is unable to properly boot up with corrupt firmware.

In item 254, the storage device powers on, and a processor, such as a processor 122A-122N of FIG. 1, loads the bootloader. The bootloader is stored in the NOR memory device, and thus, the bootloader is available immediately on power-up. The updated firmware does not include an update to the bootloader. The bootloader is kept separate and immutable during the firmware update of the NOR memory device in item 216 of method 200. As such, the bootloader will not be corrupted by a power cycle.

In item 256, the bootloader determines whether the firmware stored in the NOR memory device is corrupt or non-operational. If the NOR memory device contains operational firmware, the method 250 proceeds to item 258. In item 258, the storage device is booted up with the operational firmware stored in the NOR memory device. If the firmware stored in the NOR is corrupted or non-operational, the method 250 proceeds to item 260.

In item 260, the bootloader brings up the NAND memory device and finds the updated firmware package. The updated firmware package may be written to a reserved area of the NAND memory device. After the bootloader finds the updated firmware package stored in the NAND memory device, the method 250 proceeds to item 262. In item 262, the bootloader loads the updated firmware package into the DRAM device and the storage device reboots into the updated firmware via the DRAM device.

After the storage device is rebooted with the updated firmware, the storage device continues to sync or rewrite the updated firmware to the NOR memory device to fix the corruption in item 264. If the updated firmware is fully written or synced to the NOR memory device in item 264, the status of the NOR memory device may updated, such as in item 220 of the method 200.

Utilizing a bootloader that is separate and immutable during the firmware update to the NOR memory device and storing a copy of the updated firmware on the NAND memory device allows the storage device to update firmware in a power-safe manner. If the write of the updated firmware to the firmware slot of the NOR memory device is interrupted or incomplete, the bootloader can bring up the NAND memory device and load the updated firmware into the DRAM device. Thus, the storage device can reboot into the updated firmware via the DRAM device, rather than through corrupt or non-operational firmware stored the NOR memory device.

Even if the storage device experiences a power cycle while writing the new/updated firmware to the NOR firmware slot, a copy of the updated firmware is still stored uncorrupted in the NAND memory device. Thus, the storage device can use the non-updated bootloader to bring up a copy of the updated firmware stored in the NAND memory device and load the updated firmware into the DRAM device to reboot into. As such, the firmware update process is power-safe, and the storage device will not be rendered unusable. Furthermore, syncing the NOR memory device with the updated firmware can be accomplished quickly, as the NOR memory device utilizes only a single firmware slot, and there is no need to expend excess time to update multiple firmware slots.

By using a dual-boot process and a single firmware slot on the NOR memory device, new or updated firmware stored in the NAND memory device (or other fast non-volatile memory) can be booted into via the DRAM device and safely written to the NOR memory device (or other slow non-volatile memory) in a power-safe manner without sacrificing speed. Thus, the NOR memory device usage is minimal, power safety is maintained, slow download times are reduced, and device cost is reduced.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

In one embodiment, a method for operating a storage device comprises writing new firmware to a first non-volatile memory device of the storage device, loading the new firmware into a volatile memory device of the storage device from the first non-volatile memory device, and booting the storage device with the new firmware loaded into the volatile memory device. The method further comprises updating a firmware slot on a second non-volatile memory device of the storage device with the new firmware, and updating a status of the second non-volatile memory device once the firmware slot is finished updating.

The first non-volatile memory device may be a NAND memory device. The second non-volatile memory device may be a NOR memory device. The volatile memory device may be a DRAM device. The method may further comprise rebooting the storage device with the new firmware loaded into the volatile memory device before updating the status of the second non-volatile memory device when the storage device power cycles while updating the firmware slot on the second non-volatile memory device with the new firmware.

In another embodiment, a method for operating a storage device having one or more non-volatile memory devices and a volatile memory device comprises booting the storage device with an original firmware from a first non-volatile memory device of the one or more non-volatile memory devices, determining an updated firmware is available in a second non-volatile memory device of the one or more non-volatile memory devices, and loading the updated firmware into the volatile memory device. The method further comprises rebooting the storage device with the updated firmware loaded into the volatile memory device, writing the updated firmware to the first non-volatile memory device, and rebooting the storage device with the updated firmware loaded into the volatile memory device when the storage device loses power before the updated firmware is completely written to the first non-volatile memory device.

The first non-volatile memory device may be a NOR memory device. The NOR memory device may comprise a single firmware slot. The second non-volatile memory device may be a NAND memory device. The method may further comprise performing a power on procedure for the storage device prior to the booting the storage device with the original firmware from the first non-volatile memory device. The performing the power on procedure for the storage device prior to the booting the storage device with the original firmware from the first non-volatile memory device may be performed by a controller.

In yet another embodiment, a method for operating a storage device having a non-volatile memory device and a volatile memory device comprises writing an updated firmware to a firmware slot of the non-volatile memory device, powering on the storage device after experiencing a power cycle before the updated firmware could be fully written to the firmware slot of the non-volatile memory device, booting the storage device with the updated firmware loaded into the volatile memory device, re-writing the updated firmware to the firmware slot of the non-volatile memory device, and updating a status of the non-volatile memory device once the firmware slot is finished writing.

The volatile memory device is a DRAM device. The non-volatile memory device may be a NOR memory device. The method may further comprise checking a NAND memory device of the storage device for new firmware prior to the writing the updated firmware to the firmware slot of the NOR memory device. The method may further comprise storing the updated firmware in the volatile memory device before writing the updated firmware to the firmware slot of the NOR memory device.

In one embodiment, a data storage device comprises a plurality of non-volatile memory devices, one or more volatile memory devices, and a controller coupled to the plurality of non-volatile memory devices and the one or more volatile memory devices. The controller is configured to boot the data storage device with an original firmware from a first non-volatile memory device of the plurality of non-volatile memory devices, load a firmware update into the one or more volatile memory devices, reboot the data storage device with the firmware update loaded into the one or more volatile memory devices, and write the firmware update to the first non-volatile memory device.

The plurality of non-volatile memory devices may comprise one or more NOR memory devices and one or more NAND memory devices. The controller may be further configured to write the firmware update to a second non-volatile memory device of the plurality of non-volatile memory devices. The first non-volatile memory device may be a NOR memory device, and the second non-volatile memory device may be a NAND memory device. The controller may be further configured to reboot the data storage device with the firmware update loaded into the one or more volatile memory devices when the data storage device power cycles while writing the firmware update to the first non-volatile memory device.

In another embodiment, a data storage device comprises a plurality of non-volatile memory devices and one or more volatile memory devices. The data storage device further comprises means for booting the data storage device with an original firmware stored in a first non-volatile memory device of the plurality of non-volatile memory devices, means for writing an updated firmware to a second non-volatile memory device of the plurality of non-volatile memory devices, means for storing the updated firmware in the one or more volatile memory devices, means for rebooting the data storage device with the updated firmware stored in the one or more volatile memory devices, and means for writing the updated firmware to the first non-volatile memory device.

The data storage device may further comprise means for updating a status of the first non-volatile memory device, wherein the status of the first non-volatile memory device indicates whether the updated firmware was entirely written to the first non-volatile memory device. The one or more volatile memory devices may comprise at least one DRAM device. The updated firmware may be stored in the at least one DRAM device of the one or more volatile memory devices. The data storage device may further comprise means for rebooting the data storage device with the updated firmware after the data storage device power cycles while writing the updated firmware to the first non-volatile memory device. The first non-volatile memory device may be a NOR memory device and the second non-volatile memory device may be a NAND memory device.

While the foregoing is directed to embodiments of the present disclosure, other and further embodiments of the disclosure may be devised without departing from the basic scope thereof, and the scope thereof is determined by the claims that follow.

What is claimed is:

1. A method for operating a storage device having one or more non-volatile memory devices and a volatile memory device, comprising:
    booting the storage device with an original firmware from a first non-volatile memory device of the one or more non-volatile memory devices;
    determining an updated firmware is available in a second non-volatile memory device of the one or more non-volatile memory devices;
    loading the updated firmware into the volatile memory device;
    rebooting the storage device with the updated firmware loaded into the volatile memory device;
    writing the updated firmware to the first non-volatile memory device; and
    rebooting the storage device with the updated firmware loaded into the volatile memory device when the storage device loses power before the updated firmware is completely written to the first non-volatile memory device.

2. The method of claim 1, wherein the first non-volatile memory device is a NOR memory device.

3. The method of claim 2, wherein the NOR memory device comprises a single firmware slot.

4. The method of claim 1, wherein the second non-volatile memory device is a NAND memory device.

5. The method of claim 1, further comprising performing a power on procedure for the storage device prior to the booting the storage device with the original firmware from the first non-volatile memory device.

6. The method of claim 5, wherein the performing the power on procedure for the storage device prior to the booting the storage device with the original firmware from the first non-volatile memory device is performed by a controller.

7. A method for operating a storage device having a non-volatile memory device and a volatile memory device, comprising:
    writing an updated firmware to a firmware slot of the non-volatile memory device;
    powering on the storage device after experiencing a power cycle before the updated firmware could be fully written to the firmware slot of the non-volatile memory device;
    booting the storage device with the updated firmware loaded into the volatile memory device;
    re-writing the updated firmware to the firmware slot of the non-volatile memory device; and
    updating a status of the non-volatile memory device once the firmware slot is finished writing.

8. The method of claim 7, wherein the volatile memory device is a DRAM device.

9. The method of claim 7, wherein the non-volatile memory device is a NOR memory device.

10. The method of claim 9, further comprising checking a NAND memory device of the storage device for new firmware prior to the writing the updated firmware to the firmware slot of the non-volatile memory device.

11. The method of claim 9, further comprising storing the updated firmware in the volatile memory device before writing the updated firmware to the firmware slot of the non-volatile memory device.

12. A data storage device, comprising:
a non-volatile memory device;
a volatile memory device; and
a controller coupled to the non-volatile memory device and the volatile memory device, wherein the controller is configured to:
boot the data storage device from the non-volatile memory device;
determine an updated firmware is available;
load the updated firmware into the volatile memory device;
reboot the storage device with the updated firmware;
write the updated firmware to the non-volatile memory device; and
reboot the storage device with the updated firmware after experiencing a power cycle before the updated firmware could be fully written to the non-volatile memory device.

13. The data storage device of claim 12, wherein the rebooting with the updated firmware is from the volatile memory when the storage device experiences the power cycle.

14. The data storage device of claim 12, wherein the non-volatile memory device comprises one or more NOR memory devices and one or more NAND memory devices.

15. The data storage device of claim 12, wherein the controller is further configured to update a status of the non-volatile memory device, wherein the status of the non-volatile memory device indicates whether the updated firmware was entirely written to the non-volatile memory device.

16. The data storage device of claim 12, wherein the volatile memory device comprises at least one DRAM device.

17. The data storage device of claim 16, wherein the updated firmware is stored in the at least one DRAM device of the volatile memory device.

18. The data storage device of claim 12, wherein the controller is further configured to reboot the data storage device with the updated firmware after the data storage device power cycles while writing the updated firmware to the non-volatile memory device.

19. The data storage device of claim 12, wherein the controller is configured to boot the data storage device from the non-volatile memory device while determining an updated firmware is available.

20. The data storage device of claim 12, wherein booting the data storage device comprises booting from NOR and wherein loading the updated firmware comprises loading the updated firmware to the volatile memory from NAND.

* * * * *